United States Patent [19]

McCool

[11] Patent Number: 5,800,038
[45] Date of Patent: Sep. 1, 1998

[54] RIM MOUNTED MOTORCYCLE HEADLIGHT VISOR

[75] Inventor: Timothy McCool, Yorba Linda, Calif.

[73] Assignee: Cobra Engineering Corporation, Anaheim, Calif.

[21] Appl. No.: 602,981

[22] Filed: Feb. 16, 1996

[51] Int. Cl.⁶ ............................................. F21V 1/00
[52] U.S. Cl. ..................... 362/72; 362/61; 362/255
[58] Field of Search ....................... 362/72, 255, 257, 362/311, 354, 61, 227; D26/139

[56] References Cited

U.S. PATENT DOCUMENTS

| | | | |
|---|---|---|---|
| D. 84,280 | 6/1931 | Frame | D26/139 |
| D. 84,982 | 9/1931 | Frame | D26/139 |
| D. 266,027 | 8/1982 | Saunders | D26/139 |
| D. 295,563 | 5/1988 | Speck | D26/139 |
| D. 375,568 | 11/1996 | Metthies | D26/139 |
| 1,096,381 | 5/1914 | Lokerse | 362/257 |
| 1,279,991 | 9/1918 | Corey | 362/347 |
| 1,289,814 | 12/1918 | Nelson | 362/354 |
| 1,325,619 | 12/1919 | Clemmans | 362/61 |
| 1,412,411 | 4/1922 | McInroy | 362/341 |
| 1,461,749 | 7/1923 | Burbidge | 362/354 |
| 1,468,276 | 9/1923 | Brocker | 362/61 |
| 1,474,714 | 11/1923 | Hartmann . | |
| 1,488,284 | 3/1924 | Renner | 362/354 |
| 1,499,083 | 6/1924 | Stephens | 362/61 |
| 1,531,820 | 3/1925 | Schultz | 362/341 |
| 1,539,131 | 5/1925 | McCarley | 362/354 |
| 1,549,781 | 8/1925 | McCarley | 362/354 |
| 1,555,397 | 9/1925 | Brooks et al. | 362/354 |
| 1,618,365 | 2/1927 | Cordes | 362/354 |
| 1,704,894 | 3/1929 | Hendrikson | 362/227 |
| 1,735,090 | 11/1929 | Pollard | 362/255 |
| 1,812,779 | 6/1931 | Geary | 362/354 |
| 1,919,224 | 7/1933 | Kelly | 362/61 |
| 1,952,615 | 3/1934 | Timmons | 362/354 |
| 2,165,899 | 7/1939 | Matson | 362/341 |
| 2,550,594 | 4/1951 | Petrakakis | 362/339 |
| 2,701,298 | 2/1955 | Michailovsky | 362/354 |
| 3,922,031 | 11/1975 | Hugon | 362/72 |
| 4,189,762 | 2/1980 | Nakazawa | 362/72 |
| 4,262,959 | 4/1981 | Saunders | 362/78.1 |
| 4,356,536 | 10/1982 | Funabashi et al. | 362/72 |
| 4,475,147 | 10/1984 | Kristofek | 362/148 |

Primary Examiner—Ira S. Lazarus
Assistant Examiner—Matthew Spark
Attorney, Agent, or Firm—Fulwider Patton Lee & Utecht, LLP

[57] ABSTRACT

Rim mounted visor apparatus for mounting from an endless motorcycle headlight rim formed at its forward extremity with a radially in turned retaining lip. The visor includes a visor plate in the form of a sector of a cylinder configured at its rear extremity with a plurality of rearwardly projecting hangers spaced annularly about the visor plate and configured with respective radially outwardly projecting retainer ribs for engaging behind the retaining lip of the rim and engageable by a resilient retaining rod which is configured to complement the curvature of the rim and, upon installation, urge the respective hangers radially outwardly to hold the visor firmly engaged behind the retaining lip.

9 Claims, 1 Drawing Sheet

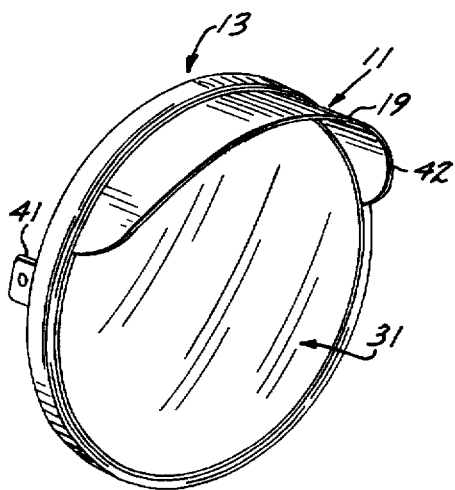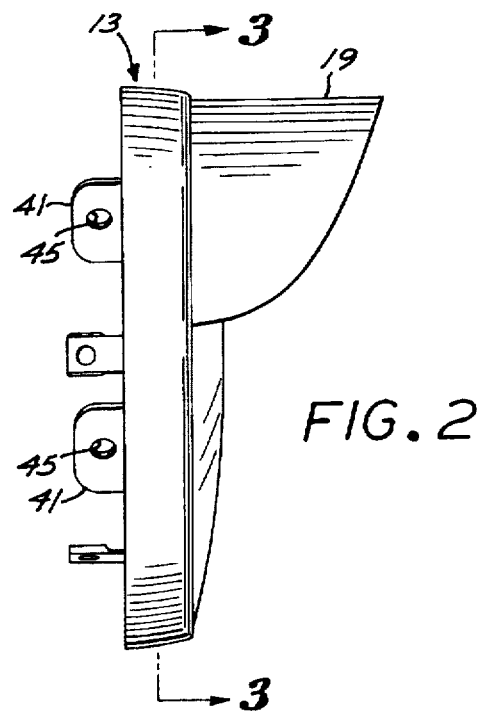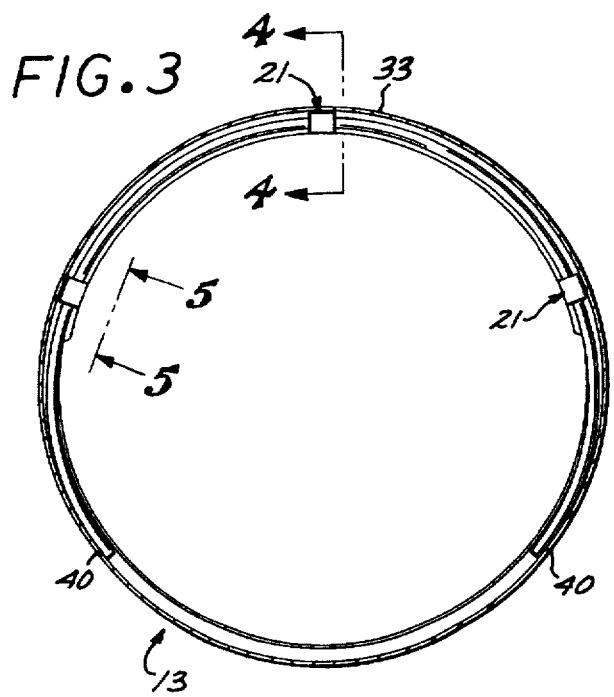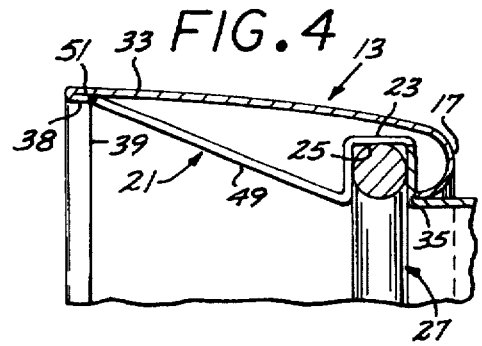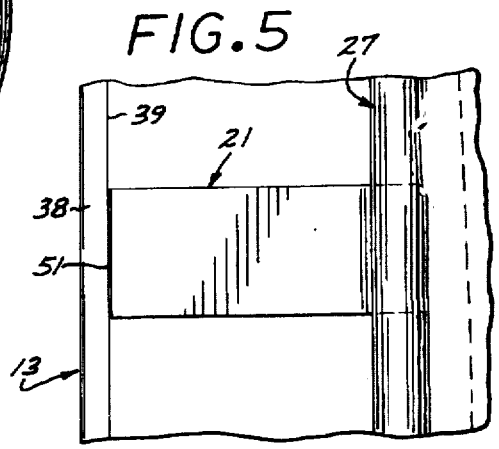

5,800,038

1

RIM MOUNTED MOTORCYCLE HEADLIGHT VISOR

BACKGROUND OF THE INVENTION

1. Field of the Invention

The present invention relates to after market visors for mounting from a motorcycle headlight rim.

2. Description of the Prior Art

Motorcycles have for many years presented a great appeal to riders as associated with maneuverability, inexpensive operation and exhilaration that comes with the feeling of freedom. A draw back with the operation of motorcycles, particularly at night or during inclement weather, is the fact that the rider's view of the road ahead of the vehicle at night must be illuminated by the light beam a headlight typically carried from the motorcycle handle bars or front fender, a beam which may reflect a glare into the driver's eyes. The rider's view of the road ahead is typically through a transparent windshield and/or protective transparent glasses. The viewer is thus exposed to numerous different dispersions of the light beam projected through the headlight lens and also to reflections stemming from the light beam reflecting off on-coming or overtaking traffic, roadside and overhead obstacles, as well as reflections associated with moisture collected in the roadway. In some instances, original equipment motorcycles might incorporate a visor mounted to the upper portion of the headlight and forming a forwardly projecting sector of a cylindrical barrel. Such visors are intended to direct the projecting beam of light forwardly and block propagation thereof in an upward direction which might be reflected back into the rider's eyes tending to either blind him or her or result in undue dilation of his or her pupils which then detracts significantly from the driver's vision and ability to view on-coming obstacles from some distance ahead and in sufficient time to allow for maneuvers which might avoid a catastrophic collision.

In recognition of the need for visors, various different constructions have been proposed for after market visors. Motorcycles typically incorporate a headlight assembly which may be constructed along the lines of that shown in U.S. Pat. No. 4,356,536 to Cozener. Such assemblies typically incorporate an endless rim to be nested about the peripheral edge of a headlight housing. Rims of this type present a particular challenge to the mounting of after market visors thereto since access must be had to the space in and around the rim and adjacent the light housing for mounting of the after market visor.

For other motorcycle headlight constructions where the rim is of split construction along the lines of that shown in U.S. Pat. No. 1,279,991 to Carey, the challenge is less significant since the rim fastener may be loosened to free the rim for expansion to allow for insertion of a visor mounting flange into sandwiched relationship between the rim and headlight housing. One currently accepted visor construction incorporates a sector of a cylindrical plate formed at its rear extremity with a radially outwardly turned flange to be received on the radially inner side of the headlight rim and formed with a pair of centrally located, rearwardly projecting holding tabs formed with annularly aligned confronting mounting cutouts configured to flip the opposite side of a nub formed at the top of the housing of a headlight lens. Such visors are difficult to install and their use is limited to headlight construction where the original periphery of the lens includes such nubs for gripping by the holding tabs. Consequently, there exists a need for a rim mounted visors which has universal application and can be utilized with an endless rim and with headlight lenses having a multitude of different configurations.

SUMMARY OF THE INVENTION

The present invention is characterized by an arcuate visor plate formed with a radius of curvature complementing that of a headlight rim formed with a forwardly disposed radially inwardly turned retaining lip. The visor is formed with rearwardly projecting hangers, each formed with a radially outwardly projecting rib configured to complementally engage behind the retaining lip and further formed with a radially inwardly opening nesting groove for receipt of a spring retaining rod, also having a radius of curvature complementing that of the rim. Thus, the visor may be attached to the rim by inserting the hangers axially rearwardly thereinto to engage the ribs behind the lip and the retainer rod then flexed to also be inserted within the rim to engage in the nesting grooves to urge the hangers radially outwardly to maintain the ribs engaged behind the retaining lip.

Other objects and features of the invention will become apparent from consideration of the following description taken in conjunction with the accompanying drawings.

BRIEF DESCRIPTION OF THE DRAWINGS

FIG. 1 is a perspective view of a rim mounted headlight visor of the present invention;

FIG. 2 is a left side view, in enlarged scale, of the visor shown in FIG. 1;

FIG. 3 is a vertical sectional view taken along the line 3—3 of FIG. 2;

FIG. 4 is a vertical section view, in enlarged scale, taken along the line 4—4 of FIG. 3; and FIG. 5 is a fragmentary view, in enlarged scale, taken along the line 5—5 of FIG. 3.

DESCRIPTION OF THE PREFERRED EMBODIMENT

Referring to FIGS. 1 and 4, the rim mounted headlight visor apparatus of the present invention, generally designated 11, is intended to be mounted from an endless headlight rim 13 of conventional construction. Many modern day motorcycles are constructed with a headlight rim 13 which is unbroken to provide an endless rim and is configured at its forward end with an annular radially inwardly turned retaining lip 17 (FIG. 4). The visor apparatus 11 of the present invention takes advantage of the inherent configuration of the rim 13 to facilitate mounting thereof. In this regard, the visor 11 is in the form of a sector of a cylindrical visor plate 19 configured with a plurality of rearwardly extending hangers, generally designated 21, which are each configured adjacent the rear of the cylindrical visor plate 19 with a U shaped radially inwardly opening clip defining on the outside a radially outwardly projecting retaining rib 23 and on the inside an inwardly opening nesting groove 25 for removable receipt of a spring retaining rod, generally designated 27. The retaining rod is bent into a radius of curvature slightly larger than the radius of curvature for the rim 13 and forms a sector of a circle slightly larger than a diametrical half of such rim to thereby inherently snap radially outwardly into place within the rim 13 to engage the respective nesting grooves 25 and urge the respective ribs 23 radially outwardly into firm engagement behind the retaining lip 17.

With the current popularity of motorcycles in the recreation market, numerous different models of motorcycles are currently on the road and experience dictates that motorcycle owners often desire to improve the appearance of their vehicles and enhance the safety of operation. Oftentimes, when motorcycles are to be ridden at night or in inclement weather, the riders experience light diffusion and reflection from the headlight beam which frequently interfere with their overall vision of the road and oncoming traffic as well as obstacles along the road side. One accessory found to effectively improve the visibility of the rider at night and in inclement conditions is the addition of a visor accessory over the headlight to thus direct the projected beam forwardly and maintain it downwardly toward the road surface and to block diffusion and reflections directly upwardly into the driver's field of view.

Many different visor constructions are available from different accessory shops and catalogs. However, prior art after market visor accessories typically require a construction where the headlight rim must be split so it can be expanded relative to the periphery of the headlight assembly so that an annular gap can be created between such headlight and the rim for inter fitting of some type of visor holder into sandwiched relationship between such rim and the headlight. Then, when the rim fastener is tightened, the holder will be trapped in position to hold the visor in place. Many current original equipment motorcycles are supplied with endless headlight rims which cannot easily be manipulated about to create an effective annular gap for receipt of a holder to be trapped between the rim and headlight. These devices then frequently require substantial work and skill in replacing various components and modifications to thereby allow for mounting of after market headlight visors. The headlight visor of the present invention is directed to this problem.

Many current motorcycle headlight rims 13 are constructed to closely fit the periphery of a headlight lens, generally designated 31, and are formed with a generally ring shaped rim body 33 (FIG. 4) configured at the forward extremity with the retaining lip 17 which curves radially inwardly and then rearwardly to terminate in a rearwardly facing annular rear edge 35 which is typically disposed in abutting relationship against the front of the lens 31 to hold the lens firmly in position relative to the rim. The rim 13 is typically formed at its rear extremely with a radially inwardly and forwardly turned marginal border flange 38 terminating in a forwardly facing annular edge 39.

The rims 13 are often formed with a plurality of rearwardly projecting, annularly spaced mounting tabs 41 having respective mounting holes 45 for receipt of mounting screws which serve to attach the rim to the surrounding housing structure.

The visor plate 19 is configured with a contoured leading edge 42 (FIG. 2) and is constructed at its rear extremity with, for instance, three rearwardly projecting hangers 21, one located centrally at the very top of the visor plate 19, at the 12:00 o'clock position, and one spaced equidistant on either side thereof at say the 10:00 o'clock and 2:00 o'clock positions.

The respective hangers 21 are in the form of metallic strips formed integral with the visor plate 19. The visor plate and hangers 21 may be constructed of stainless steel having a certain degree of springiness or resiliency. The hangers 21 are formed at the rear extremity of the visor plate 19 with a U shaped clip which serves to define radially exteriorly the respective ribs 23 and internally the respective radially inwardly facing nesting grooves 25. The respective hangers are configured at their respective rear extremities with respective retainer strips 49 which angle radially outwardly and rearwardly from the radial inner extent of the respective retainer clips at an angle of about 30° to the axis of the headlight lens 13 and are configured with an overall length such that the respective rear ends 51 thereof about the forwardly facing annular edge 39 of the flange 38 to thereby cooperate in trapping the hanger 21 between the rear edge 35 of the retaining lip 17 and the annular edge 39 of the flange 38 as shown in FIG. 4.

The retaining rod 27 is also constructed of spring stainless steel and has a cross sectional diameter substantially the same as the longitudinal dimension of the respective nesting grooves 25 (FIG. 4). The retaining rod 27 is formed with a length sufficient to form substantially 330° of a full circle and a radius of curvature slightly greater than the radius for the rim 13 such that the opposite ends 40 thereof (FIG. 3) may be flexed inwardly to allow such bow to be received within such rim 13 and allow such opposite ends thereof to be flexed outwardly to engage the lower interior of such rim and urge the upper portion thereof inwardly into positive engagement with the respective nesting grooves 25 formed by the hangers 21 disposed at the top and opposite sides of the visor apparatus 11 (FIG. 3).

In operation, it will be appreciated that the visor apparatus 11, including the retaining rod 27, will be packaged together and marked for use with particular models of headlights having rims 13 of specified radii. The customer will select a visor apparatus 11 having a radius of curvature for the visor plate which is complementary to the rim 13 of his or her motorcycle. It will be appreciated that the opposite annular ends of the visor plate 19 may be flexed inwardly toward one another to accommodate various rims 13 having a limited range of different radii.

The screws mounting the tabs 41 of the rim 13 may be loosened and/or the screws mounting the housing carrying the lens 31 loosened to allow for relative movement between such lens 31 and the rim 13 to create an annular gap or space between such lens and rim. If necessary, the visor plate 19 may be flexed to accommodate the radius of curvature for such gap. The rear extremity of the visor assembly 11 may then be inserted into the gap to project the respective hangers 21 rearwardly within the confines of the rim 13 to, first engage the rear end 51 of the retainer strips 49 with the annular edge 39 so that continued rearward urging of the visor plate 19 will cause the retainer strips 49 and/or clip forming the respective ribs 23 to flex sufficiently to allow such rib to continue its rearward travel while the rear end 51 of the retainer strip is stopped. The front side of the rib 23 will then be registered with the rear edge 35 of the retaining lip 17 to thus allow such ribs 23 to be shifted radially outwardly behind such edge into the position shown in FIG. 4. This will then serve to hold the visor plate 19 temporarily in place on the rim 13. The workman may then grasp the opposite sides of the retaining rod 27 and flex the opposite ends 40 inwardly toward one another to be inserted in the gap between the rim 13 and lens 31 to be shifted rearwardly relative to such rim to register with the respective grooves 25 (FIG. 4). Then, when the workman releases the opposite sides of such retaining rod 27, such opposite sides will snap radially outwardly to engage at the respective lower extremities thereof with the interior wall of the rim 13 to thus urge the retaining rod upwardly, as viewed in FIG. 3, into firm engagement with the respective grooves 25 of the respective hangers 21 to thus positively hold such hangers in position locking the respective ribs 23 behind the retaining lip 17. In this manner, convenient installation of the visor assembly of the present invention is achieved for a great variety of headlight models without the necessity of any customized work or drilling or tapping functions.

From the foregoing, it is apparent that the visor apparatus of the present invention provides an economical and sturdy means for mounting a visor plate to headlights of a wide variety of configurations without the benefit of highly skilled technical personnel.

Various modifications and changes may be made with regard to the foregoing detailed description without departing from the spirit of the invention.

What is claimed is:

1. Headlight visor apparatus for mounting to a cylindrically shaped headlight rim of a predetermined radius and having an interior surface and a front extremity formed with a radially in turned retaining lip, said apparatus comprising:

a cylindrically shaped visor plate formed with a radius of curvature complementing said predetermined radius;

a plurality of spaced apart hanger strips projecting rearwardly from said visor plate and comprised of respective U shaped clips defining ribs projecting radially outwardly from a center of curvature of said visor plate relative to said cylindrically shaped rim and further defining respective radially inwardly opening nesting grooves on the interior of the U-Shape for, when said visor plate is engaged with said rim, registering said ribs behind said lip, said hanger strips further including respective retainer strips angling radially outwardly and rearwardly to terminate in respective rear ends configured to, when said visor plate is engaged with said rim, engage the interior surface of said rim; and a resilient arcuate retaining rod in the shape of a sector of a circle to extend around a portion of said interior surface and having a relaxed radius of curvature larger than said predetermined radius and of an annular length sufficient to, when positioned against said interior surface, extend more than half the way around said interior surface, said rod terminating in opposite ends, and configured in cross section to nest in said grooves so said retaining rod may be nested in said grooves and the opposite ends then grasped to flex said ends radially inwardly to position said hanger strips and of said rod in said rim to, upon being released, allow so opposite ends to flex radially outwardly to engage said interior surface of said rim to urge the medial portion of said retaining rod radially outwardly to trap said hanger strips against said rim.

2. A headlight visor apparatus set forth in claim 1 wherein: said hanger strips are in the form of three circumferentially spaced apart strips.

3. A headlight visor apparatus set forth in claim 1 wherein: said retaining rod is configured to extend angularly about said interior surface through substantially 360° of said circle.

4. A headlight visor apparatus set forth in claim 1 for use with a headlight rim having a rearward extremity formed with a radially inward and forwardly extending flange terminating in a forwardly facing annular edge and wherein:

said retainer strips are configured to project rearwardly and terminate in the respective said rear ends so arranged as to, when said visor is mounted on said rib, engaged against said forwardly facing annular edge to cooperate in trapping said clips in position.

5. Headlight visor apparatus as set forth in claim 1 wherein: said retaining devices are constructed of stainless steel.

6. Headlight visor apparatus as set forth in claim 1 wherein: said visor plate is constructed of stainless steel.

7. Headlight visor apparatus as set forth in claim 1 wherein: said visor plate is resilient.

8. Headlight visor apparatus for mounting to a cylindrically shaped headlight rim of a predetermined radius and having an interior surface and a front extremity formed with a radially in turned retaining lip, said apparatus consisting of:

a cylindrically shaped visor plate formed with a radius of curvature complementing said predetermined radius;

a plurality of spaced apart hanger strips projecting rearwardly from said visor plate and comprised of respective U shaped clips defining ribs projecting radially outwardly from a center of curvature of said visor plate relative to said cylindrically shaped rim and further defining respective radially inwardly opening nesting grooves on the interior of the U-shape for, when said visor plate is engaged with said rim, registering said ribs behind said lip, said hanger strips further including respective retainer strips angling radially outwardly and rearwardly to terminate in respective rear ends configured to, when said visor plate is engaged with said rim, engage the interior surface of said rim and flex said rear ends radially inwardly; and a resilient arcuate retaining rod in the shape of a sector of a circle to extend around a portion of said interior surface and having a relaxed radius of curvature larger than said predetermined radius and of an annular length sufficient to, when positioned against said interior surface, extend more than half the way around said interior surface, said rod terminating in opposite ends, and configured in cross section to nest in said grooves so said retaining rod may be nested in said grooves and the opposite ends then grasped to flex said ends radially inwardly to position said hanger strips and of said rod in said rim to, upon being released, allow said opposite ends to flex radially outwardly to engage said interior surface of said rim to urge the medial portion of said retaining rod radially outwardly to trap said hanger strips against said rim.

9. Headlight visor apparatus for mounting to a cylindrically shaped headlight rim of a predetermined radius and having an interior surface and a front extremity formed with a radially in turned retaining lip, and a rear extremity formed with a in turned forwardly projecting flange formed with a forwardly facing annular edge, said apparatus consisting of:

a cylindrically shaped visor plate formed with a radius of curvature complementing said predetermined radius;

a plurality of spaced apart hanger strips projecting rearwardly from said visor plate and comprised of respective U shaped clips defining ribs projecting radially outwardly from a center of curvature of said visor plate relative to said cylindrically shaped rim plate and further defining respective radially inwardly opening nesting grooves on the interior of the U-shape for, when said visor plate is engaged with said rim, registering said ribs behind said lip, said hanger strips further including respective retainer strips angling radially outwardly and rearwardly to terminate in respective rear ends configured to, when said visor plate is engaged with said rim, engage the interior surface of said rim and said forwardly facing annular flange; and a resilient arcuate retaining rod in the shape of a sector of a circle to extend around a portion of said interior surface and having a relaxed radius of curvature larger than said predetermined radius and of an annular length sufficient to, when positioned against said interior surface, extend more than half the way around said interior surface, said rod terminating in opposite ends, and configured in cross section to nest in said grooves so said retaining rod may be nested in said grooves and the opposite ends then grasped to flex said ends radially inwardly to position said hanger strips and of said rod in said rim to, upon being released, allow said opposite ends to flex radially outwardly to engage said interior surface of said rim to urge the medial portion of said retaining rod radially outwardly to trap said hanger strips against said rim.

* * * * *